Jan. 26, 1971  W. H. VANDER HEYDEN  3,559,044
SIDE BAND DETECTION SYSTEM FOR NUCLEAR MAGNETIC
RESONANCE FLOWMETERS
Filed April 18, 1968  2 Sheets-Sheet 1
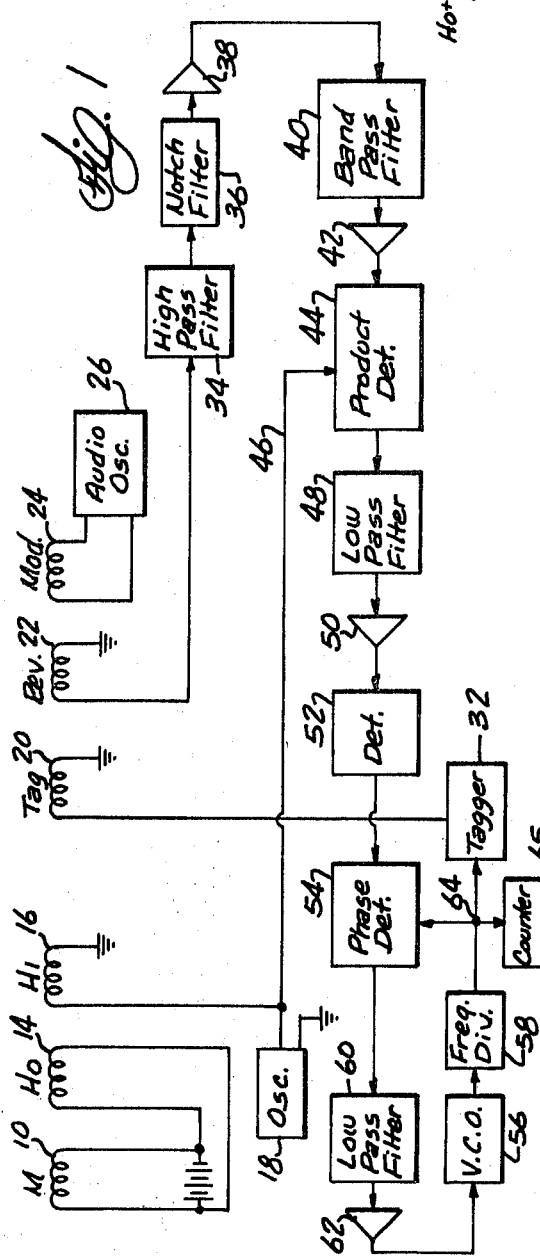
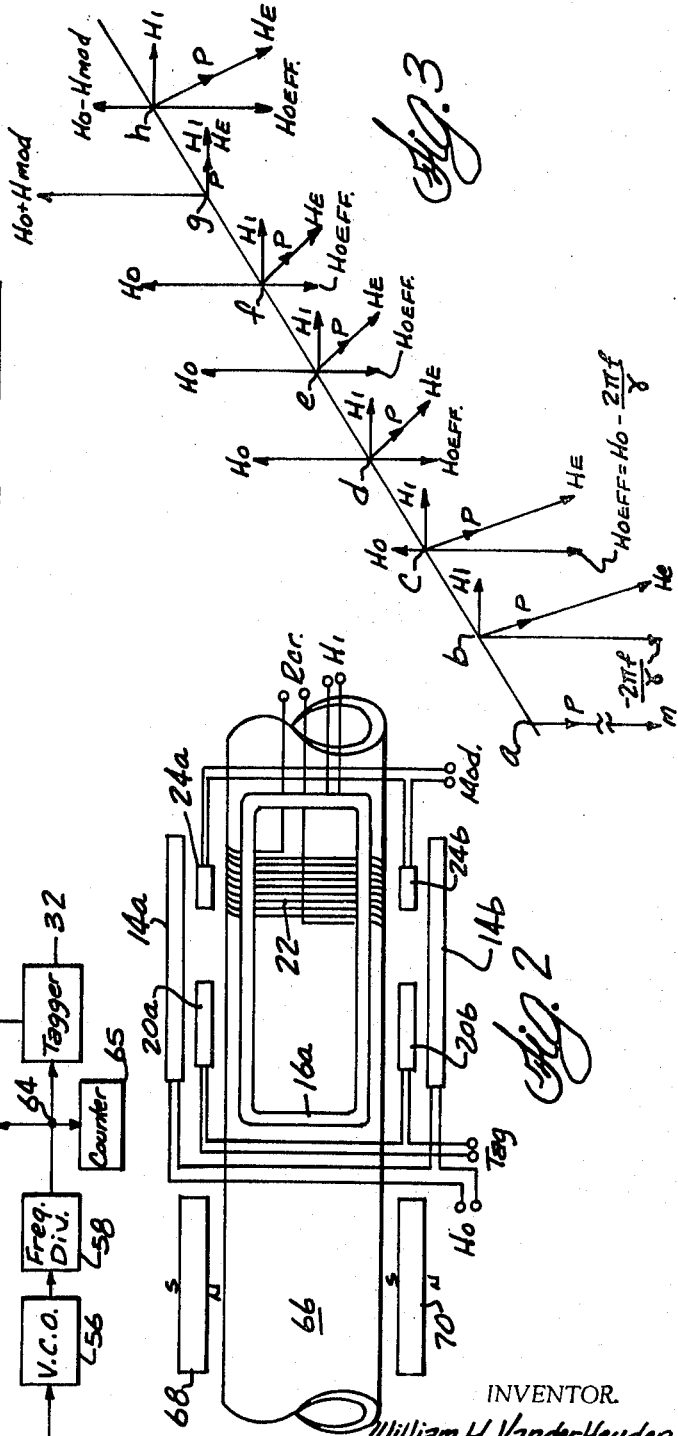
INVENTOR.
William H. VanderHeyden
BY Pendleton, Neuman,
Seibold & Williams
Attorneys

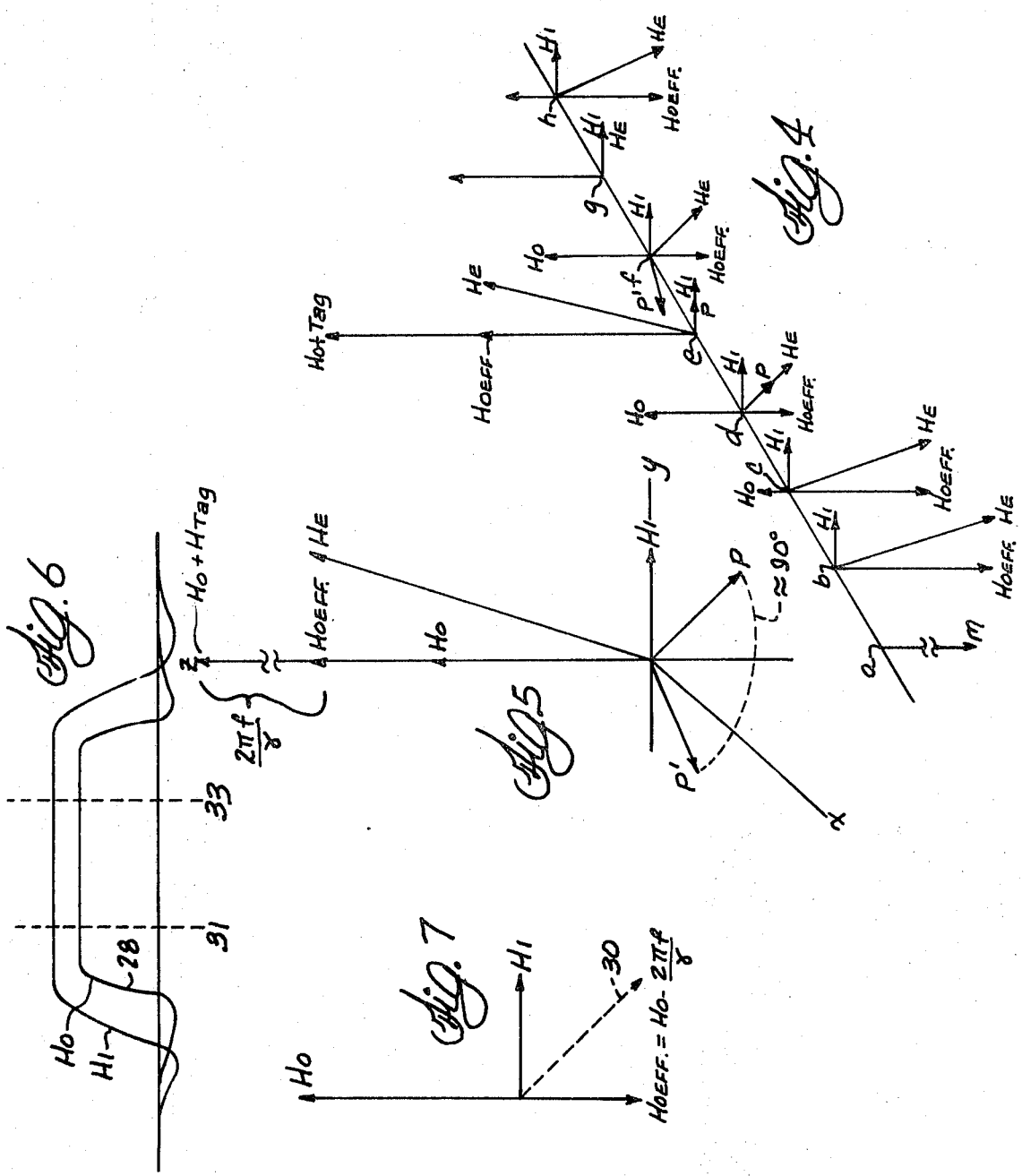

United States Patent Office 3,559,044
Patented Jan. 26, 1971

3,559,044
SIDE BAND DETECTION SYSTEM FOR NUCLEAR MAGNETIC RESONANCE FLOWMETERS
William H. Vander Heyden, Menomonee Falls, Wis., assignor to Badger Meter Manufacturing Company, Milwaukee, Wis., a corporation of Wisconsin
Filed Apr. 18, 1968, Ser. No. 722,366
Int. Cl. G01n 27/00; G01f 1/00
U.S. Cl. 324—.5                                10 Claims

ABSTRACT OF THE DISCLOSURE

Paramagnetic fluid flowing through a conduit, which has been previously polarized by a magnetizing field, is tagged by rotating the polarization direction in spaced boluses of the fluid. At a detection station located downstream from the tagging station, means is provided for oscillating the direction of polarization with an audio frequency signal, within a space occupied by crossed steady state and R.F. magnetic fields to induce nuclear magnetic resonance. The detection of a tagged bolus is realized by the production of signals at a frequency representing a side band of the R.F. frequency, spaced from the R.F. frequency by the frequency of the audio signal, which is completely separated from the R.F. signal by means of filters.

This invention relates to nuclear resonance flowmeters and particularly to an improvement therein whereby the desired signal produced by the receiving apparatus at the detection station, in response to the passage of a tagged bolus of paramagnetic fluid, may be completely and effectively separated from any residual component at the frequency of the R.F. field at the detection station which induces nuclear magnetic resonance.

In previous nuclear magnetic resonance flowmeters, the desired signal has been very close in frequency to that of the R.F. field applied at the detection station. This R.F. field is necessary to induce nuclear magnetic resonance at the detection station, which is the condition detected by the receiving apparatus, but its induction in the receiver coil makes it difficult to detect the desired signal. If the desired signal is shifted in frequency from that of the R.F. field, it becomes more readily and completely detectable and increases the realizable signal-to-noise ratio of the system. The signal-to-noise ratio is an important consideration in NMR flowmeters, as the signal levels obtained at best are many orders of magnitude below the levels of the fields required to produce such signals. Consequently, any improvement which can be made in the sensitivity of the detection system to passage of a tagged bolus is very desirable.

It is also desirable to have the tagging station, at which the polarization of the paramagnetic fluid is modified, located physically close to the detection station, to accommodate low flow rates. As all fluids tend to lose their tags with time, low rates present less available signal at the detection station. When the detection station is very close to the tagging station, however, more signal is available. The same consideration applies to a fluid with a relatively low longitudinal relaxation time ($T_1$), for such a fluid loses its tag more rapidly than others.

Accordingly, it is the principal object of the present invention to provide a method and apparatus for metering the flow of a paramagnetic fluid by which the signal-to-noise ratio of the output signal may be increased.

It is another object of the present invention to provide a method and apparatus of metering the flow of a paramagnetic fluid to permit reduction of the spacing between a tagging station, at which a magnetic tag is applied to spaced boluses of fluid, is located closely adjacent to a detection station, at which the passage of the tagged boluses is detected.

It is a more specific object of the present invention to bring about the realization of the above objects by tagging the fluid as a result of rotating a prepolarized magnetization direction, so that the magnetization direction of a tagged bolus of fluid differs from the magnetization direction of an untagged bolus by a constant angle, and oscillating the direction of polarization with an audio frequency, to produce at the detection station a signal which is the sum or difference of the audio frequency and the frequency of the R.F. field, to which the fluid is exposed at the detection station.

Another object of the present invention is to provide a method and apparatus of metering the flow of paramagnetic fluid by performing the steps of shifting the direction of polarization of spaced boluses of paramagnetic fluid through a fixed angle, inducing nuclear magnetic resonance of said fluid at a location spaced downstream from where said polarization is rotated, and oscillating at an audio frequency the direction of polarization during the occurrence of said resonance to generate a signal having a frequency equal to the sum or difference of the audio frequency and the R.F. frequency at which the resonance occurs.

This and other objects of the present invention will become manifest by an examination of the following description and the accompanying drawings in which:

FIG. 1 is a functional block diagram of apparatus forming an illustrative embodiment of the present invention in which the structure of the apparatus is illustrated diagrammatically;

FIG. 2 is an elevational view, partly in cross section, of a coil assembly associated with a conduit for conveying paramagnetic fluid illustrating the arrangement of coils which are shown diagrammatically in FIG. 1;

FIG. 3 is a three-dimensional vector diagram illustrating the condition of magnetization of a preselected quantity of fluid as it traverses the conduit of FIG. 2 without the application of a tagging pulse;

FIG. 4 is a three-dimensional vector diagram illustrating the condition of magnetization of a preselected quantity of fluid as it traverses the conduit of FIG. 2 with the application of a tagging pulse;

FIG. 5 is a three-dimensional vector diagram illustrating the application of a tag to the fluid;

FIG. 6 is a diagram of the profile of the intensities of the $H_0$ and $H_1$ fields longitudinally along the fluid flow path; and FIG. 7 is a vector diagram illustrating the rotation of the effective field as the amplitude of the R.F. field is increased.

Referring now to FIG. 1, the general arrangement of apparatus incorporating an illustrative embodiment of the present invention is illustrated. Six coils are diagrammatically illustrated, each of which performs an individual function in relation to paramagnetic fluid flowing through a conduit with which the coils are associated.

A magnetization coil 10 is connected in series with a battery 12 and generates a constant unidirectional magnetic field within the conduit upstream from the other coils shown in FIG. 1. The field generated by the coil 10 will be referred to as the magnetizing or M field. As the M field is constant and unidirectional, a permanent magnet assembly may be optionally substituted for the coil 10 as more fully described hereinafter.

Located downstream from the coil 10 is an $H_0$ coil 14, which is also connected in parallel with the battery 12 so as to generate a constant unidirectional magnetic field within the conduit. This field, hereinafter referred to as the $H_0$ field, is aligned anti parallel with the M field, and is usually weaker in amplitude and is preferably homogeneous throughout the central portion of the length of the conduit occupied by it.

A coil 16 is connected to the output of an oscillator 18, and produces an R.F. field within the conduit transverse to the direction of the M and $H_0$ fields generated by the coils 10 and 14. The frequency of the oscillator 18 is related to the resonance frequency of a paramagnetic fluid within the $H_0$ field. The coil 16 will sometimes hereinafter be referred to as the $H_1$ coil and the field generated thereby as the $H_1$ field. The Larmor frequency of paramagnetic fluid within the field $H_0$ is defined by the relation $$f = \frac{\gamma H_0}{2\pi}$$

where $H_0$ is the amplitude of the $H_0$ field, and $\gamma$ is the gyromagnetic ratio of the fluid.

The $H_0$ coil 14 and the $H_1$ coil 16 both extend along the conduit, the $H_1$ coil 16 overlapping the $H_0$ coil 14. The portion of the conduit enclosed within the $H_0$ coil 14 and the $H_1$ coil 16 includes both a tagging station, by which spaced boluses of the fluid are tagged, and a detection station at which passage of the tagged boluses is detected.

A tagging coil 20 is located adjacent the conduit at the tagging station and is selectively operable to produce a field aligned in parallel to that produced by the magnetizing coil 10 and the $H_0$ coil 14. The signal applied to the tagging coil 20 is preferably a rectangularly shaped pulse with a relatively fast rise time, so that the intensity of the field in the $H_0$ direction may be changed very rapidly by the tagging coil 20.

A receiving coil 22 and a modulating coil 24 are both disposed at the detection station, located downstream from the tagging station at which the coil 20 is located. The modulating coil 24 produces a field at the detection station aligned in parallel with the M and $H_0$ direction, and is excited by an oscillator 26 to which it is connected. The axis of the receiver coil 22 is oriented in orthogonal relationship with the $H_0$ field direction and the $H_1$ field direction, and is slightly longer than the modulating coil 24 so that the ends of the receiver coil 22 overlap the ends of the modulating coil 24 slightly.

Referring now to FIG. 6, which is a diagram of the profile of the intensities of the $H_0$ and $H_1$ fields along the length of the conduit, it is seen that the intensity of the $H_1$ rises to substantially a constant level before the intensity of the $H_0$ field approaches its maximum value. The maximum intensity of the $H_0$ field is slightly less than $2\pi f/\gamma$, where $f$ is the frequency of the $H_1$ field.

When a bolus of fluid enters the area of the conduit within the $H_0$ coil 14, it has previously been polarized by the M field, under the influence of the magnetizing coil 10. This direction, as pointed out above, is parallel to the $H_0$ field direction. As the bolus passes downstream, the amplitude of the $H_1$ field rises to its maximum amplitude, as shown in FIG. 6. Since the amplitude of the $H_0$ field is less than $2\pi f/\gamma$, however, the $H_1$ field does not affect the polarization direction of the bolus. The leading edge 28 of the profile of the $H_0$ field intensity increases gradually to its maximum value. Thus, a bolus of fluid is subjected to a gradually increasing amplitude of the $H_0$ field, until $$H_0 - \frac{2\pi f}{\gamma}$$

is about equal to the $H_1$ amplitude, and the effective field operating on the bolus is shifted adiabatically through 45°, from the effective $H_0$ direction toward the $H_1$ direction. This is illustrated in FIG. 7, where the $H_0$ and $H_1$ field intensities are represented by vectors disposed at right angles, and the effective value of the $H_0$ field, namely, $$H_0 - \frac{2\pi f}{\gamma}$$

is also indicated. The effective field, $H_E$, is the resultant of the effective value of the $H_0$ field and the $H_1$ field, and is illustrated by the dashed vector 30. This is the condition attained when the $H_0$ field intensity reaches its maximum value. At the upstream extremity of the $H_0$ coil 14, the $H_E$ vector is aligned generally anti-parallel with $H_0$, since the magnitude of the $H_0$ vector is negligible. Accordingly, the effective field is shifted through 45° at the upstream edge of the $H_0$ coil, and the direction of polarization of the bolus is shifted with the effective field, as it passes down the conduit.

The slope of the upstream edge 28 of the $H_0$ intensity profile is gradual. This is to insure that the polarization of the bolus of premagnetized fluid is able to follow quite closely the changing direction of the effective field, and remain aligned with the $H_E$ vector as it shifts from the $H_0$ direction through 45°. The change in the $H_E$ direction is thus adiabatic, i.e. the $H_0$ field intensity to which the fluid is exposed as it passes down the conduit changes relatively slowly in relation to the rate of precession of the direction of polarization about the $H_E$ direction.

The tagging coil 20, centered at dashed line 31 in FIG. 7, is connected to the output of a tagging generator 32 which produces a short, intense pulse, with a fast rising leading edge. The pulse is preferably a rectangular pulse with a flat top. The tagging coil 20 is aligned to product a field parallel with the $H_0$ direction, and the effect of the tagging pulse is to abruptly and non-adiabatically change the amplitude of the $H_0$ field by a relatively large amount. The application of the tagging pulse causes the $H_0$ vector intensity to become very much greater than that illustrated in FIG. 7, whereupon the effective field $H_E$ becomes generally parallel to the $H_0$ direction for the duration of the tagging pulse. As the application of the tagging pulse is non-adiabatic, the polarization of the bolus of fluid within the tagging coil cannot follow the rapid rotation of $H_E$, and remains essentially stationary during the rise time of the tagging pulse. Thereafter, during the interval of the tagging pulse, the polarization direction precesses about the new $H_E$ direction, i.e. the $H_0$ direction at the angular velocity $\gamma H_1$. The duration of the tagging pulse is chosen so that the $H_E$ field during the period of the tagging pulse has an amplitude and duration to rotate the polarization direction by about 90° from its original direction. As seen in FIG. 5, where the $H_0$ direction is aligned with the z axis and the $H_1$ direction is aligned with the y axis, the direction of polarization is indicated by a vector P, initially in the y–z plane. The P vector rotates until it reaches a point P' about 90° displaced from its original position. The shape of the tagging pulse is not significant as long as it is sufficient in duration to allow the rotation of the polarization direction until the new position P' is reached. Preferably, the trailing edge of the pulse is also very steep so that all of the rotation of the polarization vector P, during the interval of the tagging pulse, is about the $H_0$ direction as an axis. Thereafter, when the tagging pulse ceases, $H_E$ nonadiabatically returns to the position illustrated in FIG. 7, aligned at 45° from the $H_1$ direction. But the polarization direction of the bolus has been rotated about 90° from this direction, it remains separated from the $H_E$ direction by about 90° and precesses about the new $H_E$ direction with the angular velocity $\gamma H_E$ where $H_E$ is the amplitude shown in FIG. 5.

The polarization direction of a tagged bolus of fluid thereafter precesses about the $H_1$ direction, while the polarization direction of an untagged bolus of fluid retains a polarization direction which is generally in parallel with the $H_1$ direction. The precession of the polarization direction about the $H_1$ direction quickly saturates the fluid, so that a very short distance downstream from the tagging station, the tagged bolus retains substantially no net nagnetization in any direction. It is the difference in the magnetic conditions of the tagged and untagged boluses which the receiver assembly is designed to detect.

The relationships of the various vectors have been explained in relation to FIGS. 5 and 7 as if the $H_1$ direction was fixed in space. As a matter of fact, although the $H_0$ direction is fixed in space, the $H_1$ direction, representing an R.F. signal, continually rotates about the $H_0$ direction (relative to space) at an angular velocity of $f/2\pi$, where $f$ is the frequency of the R.F. signal. Thus, the coordinate system illustrated in FIG. 5 is continually rotating about the $H_0$ direction, relative to space. Thus, an untagged bolus, which has its polarization direction aligned with the $H_1$ direction, relative to space has its polarization direction rotating at the frequency of the $H_1$ field.

After the fluid passes the tagging station, it enters an area where the intensity of the $H_0$ field is modulated. This modulation is provided by the coil 24, which produces a field aligned in parallel with the $H_0$ direction at the frequency of the oscillator 26. This frequency is an audio frequency and is preferably 8 kHz. As a result of the field generated by the modulating coil 24, the direction of polarization rotates back and forth between two directions in the $H_0$–$H_1$ plane, at an 8 kHz. rate. Where the modulating field is just equal in amplitude to the intensity of the $H_1$ field, the polarization direction is rotated back and forth between the $H_0$ and $H_1$ directions. A receiving coil 22, located within the field of the modulating coil 24, detects the passage of untagged fluid, by producing a voltage in response to induction between the coil 22 and the rotating polarization directions of the gyromagnetic nuclei in the fluid. The detected signal thus produced has a component of the $H_1$ frequency, a component of the $H_1$ frequency plus 8 kHz., and a component of the $H_1$ frequency minus 8 kHz. The signal induced in the receiver coil 22 includes the sum and difference frequencies of these components. Two side bands are formed, one 8 kHz. above the $H_1$ frequency, and the other 8 kHz. below it. One of these side bands is separated from the $H_1$ signal and employed to bring about operation of the tagging generator by apparatus which will now be described.

Referring again to FIG. 1, the circuitry associated with the receiver coil 22 has the function of detecting an unambiguous signal indicating the passage of a tagged bolus of paramagnetic fluid, and to generate therefrom a tagging pulse to be applied to the tagging coil 20. A tagging pulse is generated for each tagged bolus detected by the receiver coil 22 and the operation of the device is therefore self-sustaining. The period between two successive tagging pulses defines a constant quantity of fluid passing through the conduit, as determined by the dimensions of the conduit and the distance between the tagging coil 20 and the receiving coil 22. Accordingly, the number of pulses occurring during any given period of time can be counted to indicate the quantity of fluid flowing through the conduit during that period.

A high pass filter 34 is connected directly to the receiver coil 22 and operates to exclude any modulation frequency components within the signal generated by the receiver coil 22. The output of the high pass filter 34 is connected to the input of a notch filter 36 which is designed to exclude from the output signal any component of the $H_1$ frequency. As a result, the carrier frequently is excluded, but both side bands are still present in the output signal. The side bands are amplified in an amplifier 38, and conveyed to the input of the band pass filter 40, the function of which is to exclude all frequencies except one of the two side bands, and further reject the $H_1$ frequency.

The output of the band pass filter 40 is amplified in the amplifier 42, and then connected to one input of a product detector 44, the other input being connected via line 46 to the output of the oscillator 18. As the oscillator 18 generates the carrier frequency, the output of the product detector comprises only the 8 kHz. component of the signal detected at the receiver coil 22. This signal is connected to a low pass filter 48 by which the high frequency modulation products are eliminated. The output of the low pass filter 48 is amplified in the amplifier 50 and the output of the latter connected to a detector 52, which derives a D.C. voltage in response to the presence of the 8 kHz. signal.

Since the 8 kHz. signal occurs only when an untagged bolus is detected at the receiving coil 22, the output of the detector 52 has a rectangular wave shape with a frequency equal to the frequency at which the tagged boluses of fluid pass the receiver coil 22. The output of the detector 52 is compared in frequency with another signal in a phase detector 54, the output of which is a D.C. voltage responsive to the phase difference between the two inputs of the phase detector 54.

A voltage controlled ocillator 56 is connected through a frequency divider 58 to a second input of the phase detector 54. The output voltage generated by the phase detector 54 is connected through a low pass filter 60 and an amplifier 62 to the frequency controlling input of the voltage controlled oscillator 56. The voltage supplied to this input is such as to bring the frequency of the signal generated in the oscillator 56 to the same frequency as that presented at the output of the detector 52. Thus, when the frequency of the signal received at the detector 52 rises (accompanying an increased flow rate in the conduit) a voltage is generated at the output of the phase detector 54 which brings about an increase in the frequency of the oscillator 56, to maintain the two inputs of the phase detector 54 at the same frequency, and also in the same phase relation.

The phase detector 54 is preferably a conventional balanced modulator in which case the D.C. output is zero when the two inputs differ by 90 degrees of phase. The output of the frequency divider 58 is connected to the tagging generator 32, which generates a sharp tagging pulse for each cycle of the output of the frequency divider 58. The frequency divider 58 permits the voltage controlled oscillator 56 to operate at a relatively high frequency. The low pass filter 60 eliminates any residual A.C. components in the output of the phase detector 54 and presents only a relatively slowly varying D.C. voltage to the controlling input of the voltage controlled oscillator 56. The filter 60, however, must pass low frequency A.C. components in the output of the phase detector 54 to accommodate any changes in velocity which may occur in the flow through the conduit, so that the system can rapidly respond to changes in flow rate.

Since the phase difference between the tagging signal, applied to the tagging coil 20, and the signal detected at the receiving coil 22 is 90 degrees, the time required for the fluid to flow between the tagging station and the detection station is one-quarter of a cycle of the frequency generated at the output of the frequency divider 58. The terminal 64 is connected to this output to permit monitoring the fluid flow by counting the number of tagging cycles. The frequency at the terminal 64 is proportional to the flow rate through the conduit, and the total number of cycles during any given time is proportional to the total flow through the conduit during the same interval. The terminal 64 may be connected to a counter 65, which registers the flow.

Referring now to FIG. 2, the physical arrangement of the various coils in relation to the conduit 66 is illustrated. The conduit 66 is formed of material which has a low magnetic permeability, so that it does not interfere with the coupling between the coils and the paramagnetic fluid within the conduit. The magnetizing field is generated in the apparatus of FIG. 2, by a pair of permanent magnet members 68 and 70. The magnets 68 and 70 produce a magnetic field extending vertically as illustrated in FIG. 2. The permanent magnets 68 and 70 are an alternative to the coil 10 employed to generate the magnetizing field in the apparatus illustrated in FIG. 1.

Downstream from the magnetizing field, the $H_0$ coil 14 is comprised of two coils 14a and 14b connected in series, and arranged to produce a field through the conduit parallel to the magnetizing field generated by the permanent magnets 68 and 70. As viewed in FIG. 2, the coils 14a and 14b are each formed of a plurality of turns of wire formed in a saddle shape and rigidly mounted on the exterior of the conduit. The tagging coil 20 is composed of two sections 20a and 20b connected in series and arranged to produce a tagging field in $H_0$ direction. The modulating coil 24 comprises coils 24a and 24b connected in series to produce a field in the $H_0$ direction.

The coils 20a and 20b and the coils 24a and 24b are all disposed within the area of relatively constant field generated by the coils 14a and 14b, but are separated slightly from each other. The receiver coil 22 is formed in a solenoid, wound around about the conduit 66 within the area of relatively constant field generated by the coils 24a and 24b. The $H_1$ coil 16 comprises a pair of coils 16a and a similar coil (not shown) disposed on the opposite side of the conduit 66, connected in series and arranged to produce the $H_1$ field in orthogonal relation to the $H_0$ direction and the axis of the conduit. The $H_1$ field may be regarded as being made up of two counter rotating vectors, each rotating in a plane perpendicular to the axis of the conduit 66. One of the two vectors may be ignored; the other vector is the $H_1$ vector illustrated in FIGS. 5 and 7. The $H_1$ coil 16a and its counterpart are longer than the coils 14a and 14b so that the intensity of the $H_0$ field is less than $2\pi f/\gamma$, except in that area where the $H_1$ field intensity is relatively constant, as indicated in FIG. 6.

Referring now to FIG. 3, the relative orientation of a vector indicating the direction of polarization in a small bolus of fluid is illustrated for various positions as the bolus travels through the conduit. At position a, the fluid is exposed to the magnetizing field M and later, at position b, to the $H_1$ field generated by the $H_1$ coil 16. When the bolus enters the area of influence of the $H_1$ field generated by the coil 16, it does not change in its attitude, because there is insufficient unidirectional field to achieve resonance at the frequency of $H_1$. Between positions c and d, the magnitude of the $H_0$ field increases and the effective field $H_E$ rotates adiabatically until the polarization direction of the bolus reaches about halfway between $H_{0_{eff}}$ and $H_1$ direction at position d. The modulating field generated by the coil 24 is illustrated in opposite polarities at positions g and h, respectively. The polarization direction is thereby rotated adiabatically back and forth in the $H_0$–$H_1$ plane between the $H_{0_{eff}}$ direction and the $H_1$ direction, at the modulating frequency. The receiver coil 22 is located within the modulating field between position g and position h, and a signal is induced therein which reflects the rotation of the direction of polarization of the fluid about the $H_0$ direction, and the effect of the modulation of the modulating coil 24. The receiver coil 22 is responsive to the condition of the fluid which is encircled by it, but the effect of the modulating field extends upstream and downstream from the modulating coil. Therefore, the modulating coil 24 is conveniently made about ¾ of the length of the receiver coil 20. The relatively short length of the modulating coil 24 also helps to isolate the modulating field from the upstream positions b, c, and d, where rotation of the $H_E$ vector takes place, and from the position e, where tagging takes place.

Referring now to FIG. 4, a similar diagram illustrates the relative orientation of the polarization direction, for a bolus of fluid which is subjected to a tag. The orientation of the polarization direction is the same in FIGS. 3 and 4 up to position d where the magnetization vector has been rotated to a position about half way between the $H_{0_{eff}}$ and $H_1$ directions. At position e, the bolus is subjected to a tagging pulse, applied by coil 20, so that the field in the $H_0$ direction suddenly becomes much greater and the direction of magnetization rotates about the $H_0$ direction as long as the tagging pulse persists. As has been pointed out above, the tagging pulse persists until the magnetization vector has been rotated for 90°, after which it occupies a new position illustrated at position f. Thereafter, is precesses about the $H_1$ direction and quickly dissipates, so when the bolus reaches position g, where the modulating signal is applied, very little polarization remains, and no signal is detected in the receiver coil 22.

What is claimed is:

1. Apparatus for detecting the passage of a tagged bolus of paramagnetic fluid past a detecting station, comprising means upstream from said station for premagnetizing said fluid to polarize it in a first direction, means at said station for establishing a steady, unidirectional magnetic field in said fluid in a direction parallel to said first direction, means at said station for establishing an R.F. magnetic field in said fluid in a second direction transverse to said first direction, said unidirectional magnetic field having an intensity which varies along the path of said bolus to produce an effective magnetic field having a direction generally aligned with said first direction upstream from said detection station and generally aligned with said R.F. field at said detection station for adiabatically rotating the direction of said polarization toward the direction of said R.F. field as said fluid flows downstream, means spaced upstream from said detecting station for tagging a bolus of said fluid by selectively nonadiabatically modifying the amplitude of said steady, unidirectional magnetic field for a limited period of time to cause the direction of polarization of said bolus to shift through a fixed angle relative to the direction of said R.F. field, means at said detecting station for inducing nuclear magnetic resonance within said fluid, and detection means at said detecting station responsive to the direction of polarization of the fluid at said detection station for producing an output signal to identify said tagged bolus and to distinguish said bolus from the remainder of said fluid.

2. Apparatus according to claim 1, wherein said detection means comprises means for cyclically modulating the intensity of said steady, unidirectional field through a range of intensities near that at which said fluid resonates at said R.F. frequency, for inducing cyclic rotation of said polarization direction relative to the direction of said R.F. field, and a receiver coil at said detecting station and juxtaposed with said fluid for detecting a signal produced by the passage of said tagged bolus having a side band frequency equal to the sum or difference of the R.F. frequency and the frequency of said modulation.

3. Apparatus according to claim 2, wherein said modulating means comprises a modulating coil juxtaposed with said receiver coil and orthogonal therewith, for generating a modulating field in parallel with said steady, unidirectional field, and an audio signal source connected with said modulating coil for adiabatically rotating said polarization direction in a plane containing said first direction and the direction of said R.F. field.

4. Apparatus according to claim 1 including a conduit for conducting a flow of said fluid along a closed path, said unidirectional field having a gradually increasing intensity in an area of the conduit occupied by said R.F. field, said detection means comprising a receiver coil juxtaposed with said conduit for detecting said nuclear magnetic resonance, and said tagging means comprising a tagging coil juxtaposed with said conduit in orthogonal relation with said receiver coil, said tagging coil being located upstream from said receiver coil and downstream from said gradually increasing intensity, and generator means connected to said tagging coil for selectively pulsing said tagging coil.

5. Apparatus according to claim 4, wherein said detection means comprises means for modulating the intensity of said steady, unidirectional field in the vicinity of said receiver coil through a range of intensities near that at which said fluid resonates of said R.F. frequency, whereby there is induced in said receiver coil, as a result of the passage of said tagged bolus, a signal having a side band frequency equal to the sum or difference of the R.F. frequency and the frequency of said modulation.

6. A method for detecting a nuclear magnetic resonance phenomenon in a flowing fluid, comprising premagnetizing a quantity of fluid in a first direction, subjecting said fluid to a steady, unidirectional field in said first direction by causing said fluid to flow into a space occupied by said field, subjecting said fluid within said space to an R.F. field oriented in a second direction transverse to said first direction, said steady, unidirectional field having an intensity which, within said space adiabatically increases, in the direction of flow of said fluid, from a negligible amplitude to an amplitude slightly different from $2\pi f/\gamma$, where $f$ is the frequency of said R.F. field, and $\gamma$ is the gyromagnetic ratio of a paramagnetic nucleus within said fluid, tagging a bolus of said fluid within said space by shifting its polarization direction through a fixed angle relative to said R.F. field, inducing nuclear magnetic resonance in said fluid in a portion of said space reached by said bolus following tagging of said bolus, and detecting the direction of polarization of said bolus at said portion of said space to identify said tagged bolus and distinguish it from the remainder of said fluid.

7. The method according to claim 6 including the step of cyclically modulating the intensity of said steady, unidirectional magnetic field for inducing cyclic rotation of the direction of polarization of said bolus relative to the direction of said R.F. field, and detecting, as the result of movement said bolus, a signal equal in frequency to the sum or difference of the R.F. frequency, and the frequency of said modulation.

8. The method according to claim 6, wherein said fluid is flowing through a conduit, and said detecting step includes juxtaposing a receiving coil with said conduit downstream from the loction where said bolus is tagged.

9. The method according to claim 6, wherein said unidirectional field is produced by juxtaposing a coil with said conduit to produce a unidirectional field which increases in intensity within a portion of said space where the intensity of said R.F. field is substantially constant.

10. The method according to claim 9, including the step of tagging a new bolus each time the passage of a tagged bolus is detected.

References Cited

UNITED STATES PATENTS

| | | | |
|---|---|---|---|
| 3,147,428 | 9/1964 | Anderson | 324—0.5 |
| 3,191,119 | 6/1965 | Singer | 324—0.5 |
| 3,419,793 | 12/1968 | Genthe | 324—0.5 |
| 3,419,795 | 12/1968 | Genthe | 324—0.5 |

MICHAEL T. LYNCH, Primary Examiner

U.S. Cl. X.R.

73—194

UNITED STATES PATENT OFFICE
CERTIFICATE OF CORRECTION

Patent No. 3559044            Dated January 26, 1971

Inventor(s) William H. Vander Heyden

It is certified that error appears in the above-identified patent and that said Letters Patent are hereby corrected as shown below:

Col. 1, line 29    after "nuclear" insert    -- magnetic --

Col. 1, line 58    after "low" insert    -- flow --

Col. 4, line 26    "product" should be    -- produce --

Col. 5, line 59    "frequently" should be    -- frequency --

Col. 8, line 2    "is" should be    -- it --

Claim 5, line 5    "of" should be    -- at --

Signed and sealed this 22nd day of June 1971.

(SEAL)
Attest:

EDWARD M. FLETCHER, JR.           WILLIAM E. SCHUYLER, JR.
Attesting Officer                   Commissioner of Patents